United States Patent Office 2,990,381
Patented June 27, 1961

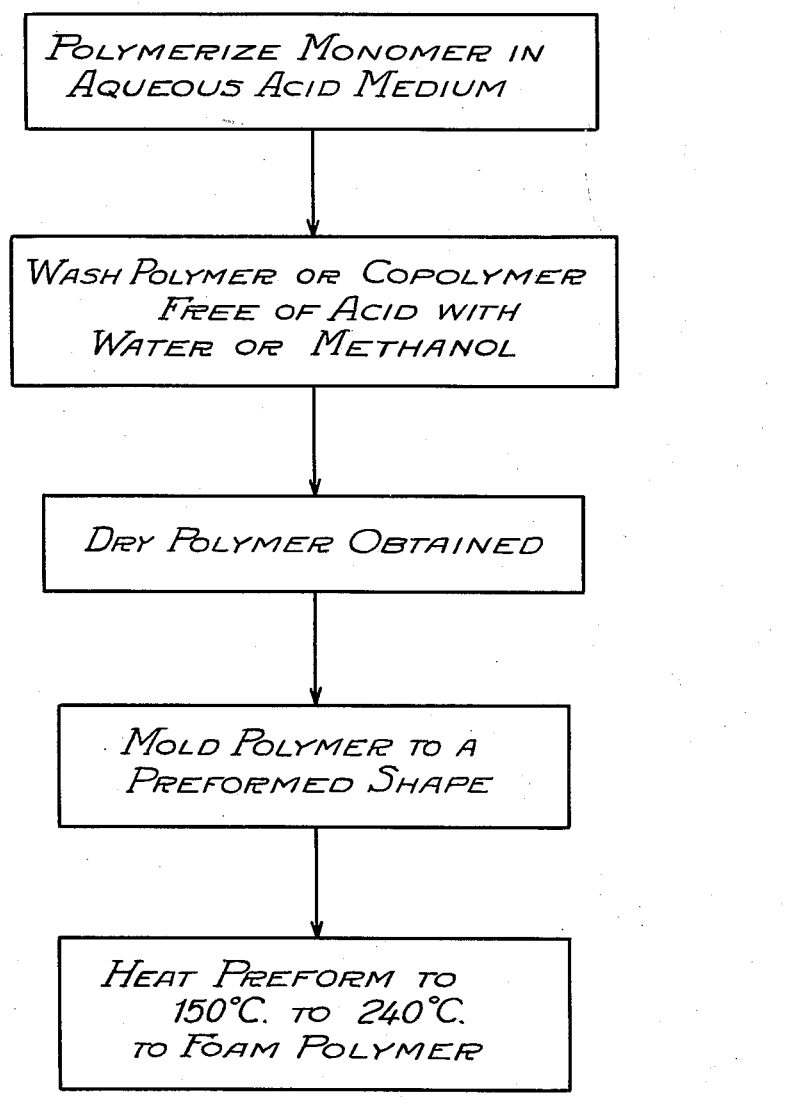

2,990,381
PREPARATION OF FOAMED ACRYLAMIDE POLYMERS
Karl Meinel, Burghausen, Upper Bavaria, Germany, assignor to Wacker-Chemie G.m.b.H., Munich, Germany, a firm of Germany
Filed May 27, 1958, Ser. No. 738,004
Claims priority, application Germany May 29, 1957
9 Claims. (Cl. 260—2.5)

Processes for the preparation of expanded plastic materials having a cellular or foamed structure by the use of agents which act as propellants and expand within the plastic structure are well known. However, each of these agents can act only within a specific temperature range. Thus, such agents are only useful in converting plastic materials into foamed structures if the temperature range in which the propellant generates gas does not lie below the softening temperature of the plastic material. To be effective, the propellant must be intimately mixed with each polymer and in such a sufficiently finely-divided form that the plastic can be converted into a foamed material. Because of these and other serious obstacles, the manufacture of foamed or expanded materials from polymers and copolymers having a basis of acrylamide faced many difficulties.

It is, accordingly, an important object of this invention to provide a new and novel process for the production of foamed plastic structures having a basis of polymers of acrylamide or of copolymers of acrylamide and compounds copolymerizable therewith such as acrylic acid, acrylonitrile or styrene.

Another object of this invention is the production of foamed plastic materials of said polymers without the use of gas generating foaming agents.

A further object of this invention is the production of foamed plastic materials comprising acrylamide and copolymers thereof by a new and novel process in which the density of the foamed plastic materials may be controlled by adjustment of the temperature.

Other objects of this invention will appear from the following detailed description and from the drawing which is a block diagram schematically illustrating the process according to the invention.

It has been found that foamed plastic structures can be formed from polymerizates and copolymerizates of acrylamide in a simple fashion without the use of propellants or expanding agents if carefully controlled and predetermined conditions are maintained during the polymerization of the monomers and during the subsequent treatment of the polymers and copolymers so obtained.

In accordance with the present invention these advantageous results are obtained if acrylamide is polymerized alone or in admixture with at most 70% by weight of acrylic acid, acrylonitrile or styrene in an aqueous acid medium under carefully controlled conditions of temperature and acid pH and in the presence of a polymerization catalyst and preferably a salt of iron, chromium, vanadium, titanium, or manganese. When the acrylamide polymers or the acrylamide copolymers so obtained are washed free of acid and are then molded under pressure and heating into a formed object, on heating the object so obtained to a temperature of 150° C. to 240° C., and preferably to a temperature between about 210° C. to about 230° C., the molded objects undergo a substantial expansion to form a foamed plastic or cellular structure with an increase in volume which may be from 10 to 50 times the initial volume, depending upon the specific conditions which are employed.

The polymerization reaction is carried out in the present process at a temperature of 20° C. to 110° C. under acid conditions. In this temperature range, especially at the lower temperatures, the acidity may vary from a pH of 4 to that corresponding to the pH of a 60% aqueous solution of sulfuric acid. When the polymerization is carried out at a temperature of from 50° C. to 100° C. the acidity can also be maintained between pH 4 and pH 7.

The metal salt, when present during said polymerization, is preferably employed in an amount of about 0.3% by weight based on the weight of the acrylamide present, but greater or lesser quantities of these metal salts can be employed.

Surprisingly enough, when the polymers formed by the instant process are heated in powder form the degree to which these polymers expand is insignificant. In order to achieve a substantial degree of expansion of the polymer into a foamed plastic structure it is necessary that the polymer first be converted by the action of heat and pressure into a homogeneous, molten mass which is then shaped as by the usual molding operations. The desired expansion then takes place when the molded article is heated. When heated at a temperature of 150° C. the desired expansion takes place slowly and to an incomplete degree but when the object is heated at a temperature of 230° C. the expansion takes place rapidly and is substantially complete. Thus, by adjusting the temperature to which the object is heated the degree of expansion may be controlled. It has been observed that no carbonization of the plastic material takes place under these conditions and that the expanded plastic material obtained is quite light in color. At the higher temperatures which can be employed, densities as low as 0.02 can be obtained. If the heating of the molded article is carried out in a vacuum, an even lower density can be reached. In order to produce a foamed plastic material of a predetermined shape the expansion of the plastic material may be carried out in a mold of the desired form. The porous or cellular objects obtained, in spite of their low density, are quite hard and stable, and not only are they water-insoluble but are quite resistant to heat up to a temperature of about 160° C. They may be employed, of course, wherever such porous materials find application, and they are particularly suitable for use as insulation material against heat or cold due to their low thermal transmission, or as an acoustic material for walls, ceilings and the like where they act efficiently to deaden noise.

In order further to illustrate this invention the following examples are given:

*Example 1*

1 part by weight of acrylmadie is dissolved in 5 parts by weight of water. The solution obtained is heated to a temperature of 40° C. after the pH has been adjusted to 7 and after 2 cc. of a 1% aqueous solution of ferrous sulfate have been added. After a gradual addition of 0.02 part by weight of ammonium persulfate to the heated mixture, the polymerization is completed in 90 minutes. A honey-yellow, gelatin-like product is obtained which is first treated with methanol and then dried. An approximately 80% yield of polymer is obtained. The polymer produced is then molded into a disk having diameter of 7 cm. and a thickness of 12 mm. employing a temperature of 190° C. and a molding pressure of 75 kg. per sq. cm. Upon heating this molded disk to a temperature of 230° C. for 30 minutes, a substantial expansion takes place and the volume increases over 36-fold, yielding an object having a foamed plastic, cellular structure. If one omits the iron salt during the polymerization step, the polymer obtained, when treated in the same manner as that described above, undergoes only a threefold increase in volume.

*Example 2*

1 part by weight of acrylamide is dissolved in 1 part by weight of water and, after the addition of 0.1 part by weight of polyvinyl alcohol, the solution is brought to a pH of 4 by the addition of acetic acid after which 0.007 part by weight of ferrous sulfate are added. The resulting solution is heated to 50° C. and the gradual addition of 0.01 part by weight of ammonium persulfate to this solution causes a prolonged exothermic reaction. A gummy polymerizate is obtained which is then treated with methanol. After being dried, the polymer is molded at a temperature of 120° C. and under a pressure of 75 kg./cm.$^2$ into a molded object which is then heated to a temperature of 230° C. for 30 minutes. The molded object undergoes a fifty-fold increase in volume with the formation of a foamed plastic structure.

*Example 3*

1 part by weight of acrylamide is dissolved in 4 parts by weight of water and the solution adjusted to a pH of 4 by the addition of acetic acid. By adding 0.01 part by weight of ammonium persulfate after bringing the solution to a temperature of 80° C. the acrylamide is converted to a soft polymerizate which precipitates out and is then washed with methanol. After drying, the polymerizate is molded at a temperature of 150° C. and under a pressure of 75 kg./cm.$^2$. On heating the object formed to a temperature of 230° C. a thirty-fold volume expansion of the molded polymer takes place.

*Example 4*

1 part by weight of acrylamide is dissolved in four parts by weight of a 1% aqueous solution of sulfuric acid. After heating to 80° C., the addition of about five drops of an aqueous 33% solution of ammonium persulfate is sufficient to initiate the polymerization. A precipitate forms which is separated and washed with methanol. After being dried, the particles are shaped to form coalesced discs at a molding temperature of 130° C. and under a pressure of 75 kg./cm.$^2$. On being heated to 230° C. for 20 to 30 minutes the discs undergo a 25-fold increase in volume to form a foamed plastic structure.

*Example 5*

1 part by weight of acrylamide is dissolved in 1.5 parts by weight of 60% aqueous sulfuric acid and 0.01 part by weight of ferrous sulfate is added. With the solution at a temperature of 80° C., the addition of 0.04 part by weight of ammonium persulfate over the course of two hours results in the precipitation of a white, tough polymer which is washed free of sulfuric acid with water. A fused shape is formed after drying by molding the polymer at a temperature of 140 ° C. and a pressure of 75 kg./cm.$^2$. The shaped body expands to thirty times its original volume when it is heated for 20 minutes at a temperature above 200° C., and preferably to 230° C. The product obtained has a foamed plastic structure.

*Example 6*

A mixture of 1 part by weight of acrylamide and 0.43 part by weight of acrylonitrile is dissolved in 3 parts by weight of a 45% aqueous solution of sulfuric acid which contains 0.15 part by weight of ferrous sulfate and the mixture polymerized at a temperature of 80° C. by the addition of 0.03 part by weight of ammonium persulfate. The precipitated polymerizate is washed free of sulfuric acid with water and methanol. When dry, the polymerizate is a white powder. The latter is then molded into a fused disc at a temperature of 165° C. and under a pressure of 75 kg./cm.$^2$. At a temperature of 230° C. the discs so obtained undergo an expansion to fifty-seven times their original volume with the formation of a foamed plastic structure. A polymerizate which is formed by the same procedure but without the addition of ferrous sulfate to the polymerization medium, yields fused discs which undergo only a ten-fold increase in volume when heated to 230° C.

*Example 7*

A mixture of 1 part by weight of acrylamide and 0.11 part by weight of styrene is copolymerized at 80° C. in 1.2 parts by weight of 60% aqueous sulfuric acid containing 0.08 part by weight of ferrous sulfate by the addition thereto of 0.009 part by weight of ammonium persulfate. A soft, yellow polymerizate is formed which is washed free of sulfuric acid with water and methanol and is then dried to the form of a white, mealy powder. By shaping this copolymerizate at 130° C. under pressure to fuse the copolymer, as described, the molded bodies so obtained yield a foamed plastic structure with a twenty-fold increase in volume on being heated to a temperature of 230° C.

*Example 8*

A mixture of 1 part by weight of acrylamide, 0.11 part by weight of acrylic acid and 0.48 part by weight of acrylonitrile is copolymerized at 70° C. in 5 parts by weight of 60% aqueous acetic acid containing 0.015 part by weight of ferrous sulfate by the introduction of 0.015 part by weight of ammonium persulfate into the aqueous mixture. The formed polymerizate is precipitated, washed with methanol, and then dried. A fused disc formed of this copolymer by employing a forming temperature of 140° C. and a pressure of 80 kg./cm.$^2$ undergoes a ten-fold increase in volume on being heated to 230° C.

*Example 9*

1 part by weight of acrylamide, 0.43 part by weight of acrylonitrile and 0.075 part by weight of acrylic acid are copolymerized in 2.9 parts by weight of an aqueous 45% sulfuric acid solution containing 0.015 part by weight of ferrous sulfate by heating the mixture to 80° C. and adding 0.02 part by weight of ammonium persulfate. The copolymerizate formed is shaken with water and then dried to yield a yellow powder. A shaped, fused body formed from this copolymer at a temperature of 155° C. and under a pressure of 80 kg./cm.$^2$ undergoes a twenty-five fold increase in volume on being heated to a temperature of 200° C. to 230° C. with the formation of a foamed plastic structure.

*Example 10*

1 part by weight of acrylamide, 0.48 part by weight of acrylonitrile and 0.11 part by weight of acrylic acid are copolymerized in 4 parts by weight of a 5% aqueous solution of sulfuric acid containing 0.016 part by weight of ferrous sulfate on heating the mixture to 70° C. and adding 0.03 part by weight of ammonium persulfate. The polymerizate obtained is washed with water and methanol, and is then dried. When molded into discs at a temperature of 140° C. and under a pressure of 80 kg./cm.$^2$, the latter, on being heated to a temperature of 230° C. for 30 minutes, undergo an expansion in volume which is thirty-three times the original volume and by this treatment form a foamed plastic structure.

Example 11

1 part by weight of acrylamide is dissolved in 5 parts by weight of water. To this solution are added 2 cc. of a 1% aqueous solution of ferrous sulfate and 0.001 part by weight of chromic sulfate. At 40° C. the polymerization is initiated by the addition of 0.02 part by weight of ammonium persulfate and the gelatinous polymerizate which is formed is washed with methanol. When dried, the polymerizate is obtained in the form of a white powder which is then molded at 150° C. and under 75 kg./cm.$^2$ pressure into a shaped body. On heating the latter to a temperature of 220 to 230° C. the volume of the shaped body increases over fifty-fold with the formation of a foamed plastic structure.

Example 12

0.0001 part by weight of ammonium vanadate is dissolved in a solution of 1 part by weight of acrylamide in 5 parts by weight of water and polymerization of the acrylamide is brought about by adding 0.02 part by weight of ammonium persulfate to the solution while it is at a temperature of 40° C. A yellow, honey-like solution is formed. The polymer formed is precipitated from the solution by the addition of methanol, and the polymer is then washed. A molded body prepared from this polymerizate by molding the latter at a temperature of 160° C. to 200° C. and under a pressure of 80 kg./cm.$^2$ undergoes a thirty-three-fold increase in volume on being heated to 230° C. and by this treatment is converted to a somewhat elastic, foamed plastic body.

Example 13

1 part by weight of acrylamide and 0.43 part by weight of acrylonitrile are copolymerized in 2.9 parts by weight of a 45% by weight aqueous solution of sulfuric acid at 80° C. on adding 0.02 part by weight of ammonium persulfate to the mixture. 0.06 part by weight of manganese carbonate are also present. The polymerizate formed precipitates as a gravelly mass which is then washed free of acid with water. A body molded of this polymerizate after it has been dried, employing a molding temperature of 170° C. and a pressure of 75 kg./cm.$^2$ is converted when heated to 230° C. to a foamed plastic body having 23 times the volume of the original body.

Example 14

A polymer is prepared in the manner described in Example 13 but in lieu of employing manganese carbonate there are added 0.015 part by weight of ferrous sulfate and 0.006 part by weight of ammonium vanadate. A polymer separates out when polymerization is induced by the addition of 0.02 part by weight of ammonium persulfate. The polymerizate is then washed free of acid with water. By heating a body molded of this molten polymer to a temperature of 230° C., a fifteen-fold increase in volume is produced.

Example 15

A polymerization reaction is carried out as in Example 13 but in place of the manganese carbonate employed there are employed 0.015 part by weight of ferrous sulfate and 0.01 part by weight of titanium sulfate. In order to effect polymerization, the addition of 0.03 part by weight of ammonium persulfate are required. The precipitated polymer formed is separated, then washed free of sulfuric acid with water and dried. By employing a temperature of 160° C. during molding, a well-fused molded body is formed which, when heated to a temperature of 230° C. is converted to a foamed plastic body having 35 times the volume of the original molded body.

While ammonium persulfate has been particularly described as the polymerization catalyst in the examples given above, other well-known polymerization catalysts such as potassium persulfate, sodium persulfate and lauryl peroxide may also be employed in the acrylamide polymerization and copolymerization reactions described.

It is understood that the foregoing detailed description is given merely by way of illustration and that many variations may be made therein without departing from the spirit of this invention.

I claim:

1. Process for the production of foamed plastic structures of polymers selected from the group consisting of a homopolymer of acrylamide monomer and copolymers of acrylamide monomer with at most 70% by weight of said copolymers of a member selected from the group consisting of acrylonitrile, acrylic acid, and styrene monomer, which comprises polymerizing said monomeric materials at a polymerization temperature of 20° C. to 110° C. in an aqueous polymerizing medium containing a peroxidic polymerization catalyst and about 0.01 to 15% by weight on the weight of the monomers employed of a metal salt of the group consisting of the sulfates of iron, chromium, vanadium, titanium and manganese, ammonium vanadate and manganese carbonate, the pH of said aqueous polymerizing medium being within a range of from neutral to that of an aqueous 60% sulfuric acid solution, washing the polymer formed free of any acid, drying the polymer, molding the dried polymer under heat and pressure to form a homogeneous molten shaped mass and then heating the shaped mass obtained to a temperature of 150° C. to 240° C. to form a foamed plastic structure.

2. Process for the production of foamed plastic structures, which comprises polymerizing acrylamide in an aqueous medium containing a peroxidic polymerization catalyst and from 0.01 to 15% by weight based on the acrylamide of a metal salt of the group consisting of the sulfates of iron, chromium, vanadium, titanium and manganese, ammonium vanadate and manganese carbonate, said polymerization being effected with said aqueous medium at a pH of from 4 to 7 and at a temperature of from 50° C. to 110° C., washing the polymer obtained free of any acid, drying the polymer, molding the dried polymer under heat and pressure to form a homogeneous molten shaped mass and then heating the shaped mass obtained to a temperature of from 150° C. to 240° C. to form a foamed plastic structure.

3. Process in accordance with claim 2 wherein the polymerization is effected with said aqueous acid medium at a pH of from 4 to that of a 60% aqueous solution of sulfuric acid and at a temperature of from 20° C. to 110° C.

4. Process for the production of foamed plastic structures, which comprises copolymerizing acrylamide monomer with at most 70% by weight of a member of the group consisting of acrylonitrile, acrylic acid, and styrene monomer in an aqueous medium containing a peroxidic polymerization catalyst and from 0.01 to 15% by weight based on the monomer employed of a metal salt of the group consisting of the sulfates of iron, chromium, vanadium, titanium and manganese, ammonium vanadate and manganese carbonate, said polymerization being effected with said aqueous medium at a pH of 4 to 7 and at a temperature of from 50° C. to 110° C., washing the polymer obtained free of any acid, drying the polymer, molding the dried polymer under heat and pressure to form a homogeneous molten shaped mass and then heating the shaped mass obtained to a temperature of from 150° C. to 240° C. to form a foamed plastic structure.

5. Process in accordance with claim 4 wherein the polymerization is effected with said aqueous acid medium at a pH of from 4 to that of a 60% aqueous solution of sulfuric acid and at a temperature of from 20° C. to 110° C.

6. Process in accordance with claim 2 wherein the metal salt is present in an amount of about 0.3% on the weight of the monomer.

7. Process in accordance with claim 3 wherein the metal salt is present in an amount of about 0.3% on the weight of the monomer.

8. Process in accordance with claim 4 wherein the metal salt is present in an amount of about 0.3% on the weight of the monomer.

9. Process in accordance with claim 5 wherein the metal salt is present in an amount of about 0.3% on the weight of the monomer.

References Cited in the file of this patent

UNITED STATES PATENTS

| | | |
|---|---|---|
| 2,525,965 | Smith | Oct. 17, 1950 |
| 2,529,449 | Ham | Nov. 7, 1950 |
| 2,813,088 | Meinel | Nov. 12, 1957 |

OTHER REFERENCES

Migrdichian: "The Chemistry of Organic Cyanogen Compounds," Monograph Series No. 105, Reinhold Publishing Corp., 1947, pages 48 and 49.

Journal American Chemical Society, volume 38, July-Dec. 1916, pages 2503–2505.